US006550923B2

(12) United States Patent
Sakamoto et al.

(10) Patent No.: US 6,550,923 B2
(45) Date of Patent: Apr. 22, 2003

(54) MIRROR SURFACE ANGLE ADJUSTING DEVICE

(75) Inventors: Masato Sakamoto, Niwa-gun (JP); Yoshio Tsujiuchi, Niwa-gun (JP); Morihiko Ogasawara, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 94 days.

(21) Appl. No.: 09/843,715

(22) Filed: Apr. 30, 2001

(65) Prior Publication Data

US 2001/0040744 A1 Nov. 15, 2001

(30) Foreign Application Priority Data

May 12, 2000 (JP) ........................ 2000-140197

(51) Int. Cl.[7] .................. G02B 5/08; G02B 7/182; B60R 1/06
(52) U.S. Cl. ............ 359/841; 359/872; 359/873; 359/874; 359/476; 359/477; 248/479; 248/480; 248/481; 248/483; 248/484; 248/485
(58) Field of Search .................. 359/841, 871, 359/872, 876, 877, 873, 874; 248/479, 480, 481, 483, 484, 485

(56) References Cited

U.S. PATENT DOCUMENTS

| | | | | |
|---|---|---|---|---|
| 4,867,408 A | * | 9/1989 | Ozaki | |
| 5,621,577 A | * | 4/1997 | Lang et al. | |
| 5,781,356 A | * | 7/1998 | Okada et al. | |
| 5,844,733 A | * | 12/1998 | Ravanini | |
| 6,447,129 B2 | * | 9/2002 | Hayashi et al. | |

FOREIGN PATENT DOCUMENTS

DE 19840213 A1 * 3/2000

* cited by examiner

Primary Examiner—Ricky D. Shafer
(74) Attorney, Agent, or Firm—Nixon Peabody LLP; Thomas W. Cole

(57) ABSTRACT

A mirror surface angle adjusting device is provided which can be used at both left and right outer mirror devices of a vehicle. At a mirror driving unit, positional relationships between respective points (fulcrum of swinging A1 and A2, first adjusting points B1 and B2, second adjusting points C1 and C2, first mounting points D1 and D2, second mounting points E1 and E2, and third mounting points F1 and F2) are set such that the points have line symmetry with respect to 45° direction reference lines P1, P2. Accordingly, from a functional standpoint as well, there are no obstacles at a time of mounting, and as a result, a same type of mirror driving unit can be used at both a left door mirror device and a right door mirror device.

20 Claims, 6 Drawing Sheets

MIRROR SURFACE ANGLE ADJUSTING DEVICE

BACKGROUND OF THE INVENTION

1. Field of the Invention

The present invention relates to a mirror surface angle adjusting device which is incorporated in a vehicle outer mirror device, and which is for adjusting a mirror surface angle.

2. Description of the Related Art

A vehicle outer mirror device is used to view the region at the rear of a vehicle while the vehicle is traveling. Among vehicle outer mirror devices, there are vehicle outer mirror devices which are equipped with a mirror surface angle adjusting device in order to improve the ability to view the region at the rear of a vehicle.

This type of mirror surface adjusting device has a housing for accommodating functional parts. Due to the housing being fixed to a frame which is provided within a visor, the mirror surface angle adjusting device is disposed at a predetermined position at a mirror front side (vehicle front side) within the visor. Further, the mirror surface angle adjusting device is equipped with a mirror holder which can swing around a pivot portion, and a mirror is held at the mirror holder. Moreover, the mirror holder is connected to a first drive rod, which is for adjusting the vertical direction angle of the mirror, and a second drive rod, which is for adjusting the left-and-right direction angle of the mirror. Due to the first drive rod and the second drive rod being moved (stroked) in the respective axial directions thereof by the driving force of a driving device, the mirror surface angle of the mirror is adjusted.

However, conventionally, the above-described mirror surface angle adjusting device has not been able to used in common for left and right vehicle outer mirror devices.

This point will be described hereinafter with reference to FIG. 6. The schematic structure of a right side door mirror device 150 is illustrated at the right side of FIG. 6. As shown in FIG. 6, in the right side door mirror device 150, a mirror driving unit 152 is set upward. The mirror driving unit 152 has a substantially rectangular parallelepiped housing 154 at which mounting portions 154A are formed at the four corners thereof. Due to the mounting portions 154A being fixed to a frame (not shown) which is provided in a door mirror visor 156, the mirror driving unit 152 is disposed at a predetermined position in the door mirror visor 156. Note that, a pivot portion 158 is provided at a lower portion of the housing 154. Further, a first drive rod 160, which is for adjusting the vertical direction angle of the mirror, is provided at an upper portion of the housing 154. Moreover, a second drive rod 162, which is for adjusting the left-and-right direction angle of the mirror, is provided next to the pivot portion 158.

A schematic structure of a left side door mirror device 164 is illustrated at the left side of FIG. 6. As shown in FIG. 6, when the mirror driving unit 152 which is used in the right side door mirror device 150 is to be used also in the left side door mirror device 164, the mirror driving unit 152 must be rotated counterclockwise 90° around the pivot portion 158 so as to be set sideways. This is because, in left and right vehicle outer mirror devices, the position of the pivot portion 158 of the mirror driving unit must be set at the same position. Use of the mirror driving unit 152 for both the left and right vehicle outer mirror devices can only be achieved by switching the functions of the first drive rod 160 and the second drive rod 162 (i.e., switching the functions for adjusting the vertical direction angle and the left-and-right direction angle of the mirror).

As a result, as shown at the left side of FIG. 6, two portions (the encircled portion designated by arrow P and the encircled portion designated by arrow Q) among the mounting portions 154A of the housing 154 of the mirror driving unit 152 interfere with the door mirror visor 156 and another part 166. Therefore, the mirror driving unit 152 cannot be used for both the left and right vehicle outer mirror devices. Thus, the mirror driving unit 152 must be individually and independently prepared for each of the right side door mirror device 150 and the left side door mirror device 164. Various drawbacks therefore arise, such as the number of parts increases, there are problems with management for ensuring the storage space and for preventing errors in assembly, and there is an increase in costs which accompanies such problems.

SUMMARY OF THE INVENTION

In view of the aforementioned, an object of the present invention is to provide a mirror surface angle adjusting device which can be used in both left and right vehicle outer mirror devices.

A first aspect of the present invention is a mirror surface angle adjusting device comprising: a pivot portion which swingably supports a holding member for holding a mirror body; a first adjusting device connected to the holding member, and which swings the holding member, in one of a vertical direction and a left-and-right direction, around the pivot portion by receiving driving force and being displaced; a second adjusting device connected to the holding member, and which swings the holding member, in another of the vertical direction and the left-and-right direction, around the pivot portion by receiving driving force and being displaced; and a housing which accommodates the pivot portion, the first adjusting device, and the second adjusting device, and the housing including a plurality of mounting portions for mounting in the rear view vehicle outer mirror device, wherein in a case in which the mirror surface angle adjusting device is mounted in a rear view vehicle outer mirror device disposed at an exterior of a vehicle, a first adjustment point of the first adjusting device and a second adjustment point of the second adjusting device have line symmetry with respect to a 45° direction reference line which forms an angle of elevation of substantially 45° with respect to a vehicle transverse direction reference line passing through a fulcrum of swinging of the pivot portion and which passes through the fulcrum of swinging, and positional relationships of mounting points of the plurality of mounting portions are set such that the mounting points have line symmetry with respect to the 45° direction reference line.

In the mirror surface angle adjusting device of the present invention, preferably, the first adjusting device moves in an axial direction relative to the first adjusting device due to receipt of the driving force, and the second adjusting device moves in an axial direction relative to the second adjusting device due to receipt of the driving force.

In the mirror surface angle adjusting device of the present invention, preferably, the housing includes a front housing disposed at a vehicle front side and a rear housing disposed at a vehicle rear side, and the front housing and the rear housing mating together, when the mirror surface angle adjusting device is being used in a rear view vehicle outer mirror device.

Further, preferably, the housing generally corresponds to a thin, square, flat-plate shape.

In the mirror surface angle adjusting device of the present invention, preferably, the pivot portion comprises a spherical receiving portion including a hemispherical concave portion comprising a bottom and formed integrally with the rear housing, a hemispherical retainer including a bottom and formed smaller in size than the spherical receiving portion and received therein, a compression coil spring urging the retainer toward the spherical receiving portion, and a screw.

Preferably, the spherical receiving portion comprises a cylindrical holding portion and includes a bottom, a boss corresponding in shape to an elongated cylinder formed at an axially central portion of the holding portion, and a spherical supporting portion extending radially outward the holding portion.

Preferably, the retainer comprises a cylindrical shaft portion inserted in the holding portion of the spherical receiving portion, and a spherical pushing portion extending radially outward from an intermediate portion of the shaft portion.

It is preferable that the holding member includes a shaft supporting portion, with the shaft supporting portion nipped between the spherical supporting portion of the spherical receiving portion and the spherical pressing portion of the retainer.

Preferably, the shaft supporting portion of the holding member is formed hemispherically at a substantially central portion of the holding member, and a through hole, whose diameter is greater than an outer diameter of the shaft portion of the retainer, is formed in a center of the shaft supporting portion.

It is preferable that urging force from the compression coil spring is applied to the shaft supporting portion of the holding member via the retainer, and the shaft supporting portion of the holding member swingably supports the spherical receiving portion.

In the mirror surface angle adjusting device of the present invention, preferably, the mirror surface angle adjusting device further comprises a mirror angle detecting device for independently detecting a vertical direction angle of a mirror surface and a left-and-right direction angle of the mirror surface.

Further, preferably, the mirror angle detecting device includes a first member for detecting a left-and-right direction angle, the first member comprising a distal end portion, a second member for detecting a vertical direction angle, the second member comprising a distal end portion, and a spherical member held rollably at the distal end portion of each of the first member and the second member, and a compression coil spring disposed between the first member and the spherical member corresponding to first member, and another compression coil spring disposed between the second member and the spherical member corresponding to second member.

In the mirror surface angle adjusting device of the present invention, preferably, the plurality of mounting points comprises three points, said one of the mounting points being set on the 45° direction reference line, and second mounting and third mounting points set at positions which are substantially line symmetry with respect to the 45° direction reference line.

In the mirror surface angle adjusting device of the present invention, preferably, the first adjusting point is set on a vertical direction line which passes through the fulcrum of swinging, and the second adjusting point is set on a horizontal direction line which passes through the fulcrum of swinging.

The holding member for holding the mirror body is swingably supported by the pivot portion. The first adjusting device and the second adjusting device are connected to the holding member. Accordingly, when the first adjusting device receives a driving force and is displaced, the holding member swings in either the vertical direction or the left-and-right direction around the pivot portion (i.e., with the pivot portion as a fulcrum). In this way, the mirror surface angle in that one direction is adjusted. Further, when the second adjusting device receives a driving force and is displaced, the holding member is swung in the other of the vertical direction and the left-and-right direction around the pivot portion, and the mirror surface angle of the mirror body in that direction is thereby adjusted.

Here, in the present invention, in a case in which the mirror surface angle adjusting device is mounted in a vehicle outer mirror device, positional relationships of respective points are set such that a first adjusting point of the first adjusting device and a second adjusting point of the second adjusting device have line symmetry with respect to a 45° direction reference line which passes through the fulcrum of swinging of the pivot portion and which forms an angle of elevation of substantially 45° with respect to a vehicle transverse direction reference line which passes through the fulcrum of swinging. In this way, for example, the first adjusting device, which is incorporated into a right side vehicle outer mirror device and which makes the holding member swing in the one direction, functions, in a case in which the mirror surface angle adjusting device is incorporated into a left side vehicle outer door mirror device, as the second adjusting device which swings the holding member in the other direction. Conversely, the second adjusting device, which swings the holding member in the aforementioned other direction in the former case, functions, in the latter case, as the first adjusting device which swings the holding member in the aforementioned one direction. Accordingly, the functions of the mirror surface angle adjusting device do not deteriorate either in the case in which the mirror surface angle adjusting device is incorporated in a right side vehicle outer mirror device or the case in which the mirror surface angle adjusting device is incorporated in a left side vehicle outer mirror device.

In the present invention, the positional relationships of the respective points are set such that the first adjusting point and the second adjusting point have line symmetry with respect to a 45° direction reference line. In this way, the distance between the fulcrum of swinging and the first adjusting point and the distance between the fulcrum of swinging and the second adjusting point are equal. As a result, in a case in which the mirror surface angle adjusting device, which is the same product, is used for a pair of left and right vehicle outer mirror devices, the positional relationships between the points at which driving force is applied to the holding member, and thus to the mirror body, are exactly the same at the left and the right. Accordingly, when the same type of mirror surface angle adjusting device is used at a pair of left and right vehicle outer mirror devices, not only are the functions of the mirror surface angle adjusting device not impaired, but also, the functions of the mirror surface angle adjusting device can be maintained at an extremely high level.

The positional relationships of the respective mounting points of the plurality of mounting portions are set such that the points have line symmetry with respect to the 45° direction reference line. Further, the structures of the pair of left and right vehicle outer mirror devices are shapes which are substantially line symmetrical with respect to the vertical direction central line of the vehicle. Thus, if the mirror surface angle adjusting device can be mounted appropriately (i.e., without the mounting portions interfering with the visor inner wall or the like) in the visor of the right side vehicle outer mirror device, the mirror surface angle adjusting device can also be mounted appropriately in a left side vehicle outer mirror device. Accordingly, no obstacles arise to the mounting of the mirror surface angle adjusting device either in the case in which the mirror surface angle adjusting device is incorporated into a right side vehicle outer mirror device or in a case in which the mirror surface angle adjusting device is incorporated into a left side vehicle outer mirror device.

As the plurality of mounting points, three mounting points are set. The first mounting point is set on the 45° direction reference line. The second mounting point and the third mounting point are set at positions which are substantially line symmetry with respect to the 45° direction reference line. Thus, a stable mounted state of the mirror surface angle adjusting device can be maintained with the minimum number of mounting points.

The first adjusting point is disposed on a vertical direction line which passes through the fulcrum of swinging, and the second adjusting point is disposed on a horizontal direction line which passes through the fulcrum of swinging. When such positional relationships are employed, adjustment of the mirror surface angle is restrained due to the relationship with the fulcrum of swinging of the pivot portion. In this way, as compared with a case in which the first adjusting point and the second adjusting point are not disposed on a vertical direction line and a horizontal direction line which pass through the fulcrum of swinging, more stable adjustment of the mirror surface angle can be carried out.

A second aspect of the present invention is a mirror surface angle adjusting device comprising: a pivot portion which swingably supports a holding member for holding a mirror body; a first adjusting device connected to the holding member, and which swings the holding member, in one of a vertical direction and a left-and-right direction, around the pivot portion by receiving driving force and being displaced; a second adjusting device connected to the holding member, and which swings the holding member, in another of the vertical direction and the left-and-right direction, around the pivot portion by receiving driving force and being displaced; and a housing which accommodates the pivot portion, the first adjusting device, and the second adjusting device, and the housing including a plurality of mounting portions for mounting in the rear view vehicle outer mirror device, wherein in a case in which a straight line which passes through a fulcrum of swinging of the pivot portion and a first adjusting point of the first adjusting device is a first straight line, a second adjusting point of the second adjusting device passes through the fulcrum of swinging and is positioned on a second straight line which is orthogonal with respect to the first straight line, and the first adjusting point and the second adjusting point have line symmetry with respect to a 45° direction reference line which forms an angle of elevation of substantially 45° with respect to the second straight line and which passes through the fulcrum of swinging, and positional relationships of mounting points of the plurality of mounting portions are set such that the mounting points have line symmetry with respect to the 45° direction reference line.

In the mirror surface angle adjusting device of the present invention, preferably, the first adjusting device moves in an axial direction relative to the first adjusting device due to receipt of the driving force, and the second adjusting device moves in an axial direction relative to the second adjusting device due to receipt of the driving force.

Further, the mirror surface angle adjusting device preferably further comprises a mirror angle detecting device for independently detecting a vertical direction angle of a mirror surface and a left-and-right direction angle of the mirror surface.

Further, preferably, the mirror angle detecting device includes a first member for detecting a left-and-right direction angle, the first member comprising a distal end portion, a second member for detecting a vertical direction angle, the second member comprising a distal end portion, and a spherical member held rollably at the distal end portion of each of the first member and the second member, and a compression coil spring disposed between the first member and the spherical member corresponding to first member, and another compression coil spring disposed between the second member and the spherical member corresponding to second member.

A first straight line, which passes through the fulcrum of swinging and the first adjusting point, and a second straight line, which passes through the fulcrum of swinging and the second adjusting point, are orthogonal to each other. Further, the positional relationships of the respective points are set such that the first adjusting point and the second adjusting point have line symmetry with respect to a 45° direction reference line which passes through the fulcrum of swinging and which forms an angle of elevation of substantially 45° with respect to the second straight line, or such that the mounting points of the plurality of mounting portions have line symmetry with respect to the 45° direction reference line. As a result, the present invention achieves the same effects as the first aspect. Namely, the first straight line and the second straight line are newly prescribed, and the specifying of the positional relationships of the respective points is carried out by using these straight lines and the 45° direction reference line as a reference.

DESCRIPTION OF THE PREFERRED EMBODIMENTS

Hereinafter, an electric, retractable door mirror device 10 relating to an embodiment of the present invention will be described with reference to FIG. 1 through FIG. 5.
[Overall Structure of Door Mirror Device 10]
First, an overall structure of the door mirror device 10 which serves as a "vehicle outer mirror device" will be described. An overall perspective view of the door mirror device 10 relating to the embodiment is illustrated in FIG. 5. Further, an exploded perspective view of the door mirror device 10 is illustrated in FIG. 4.

Figure 4:
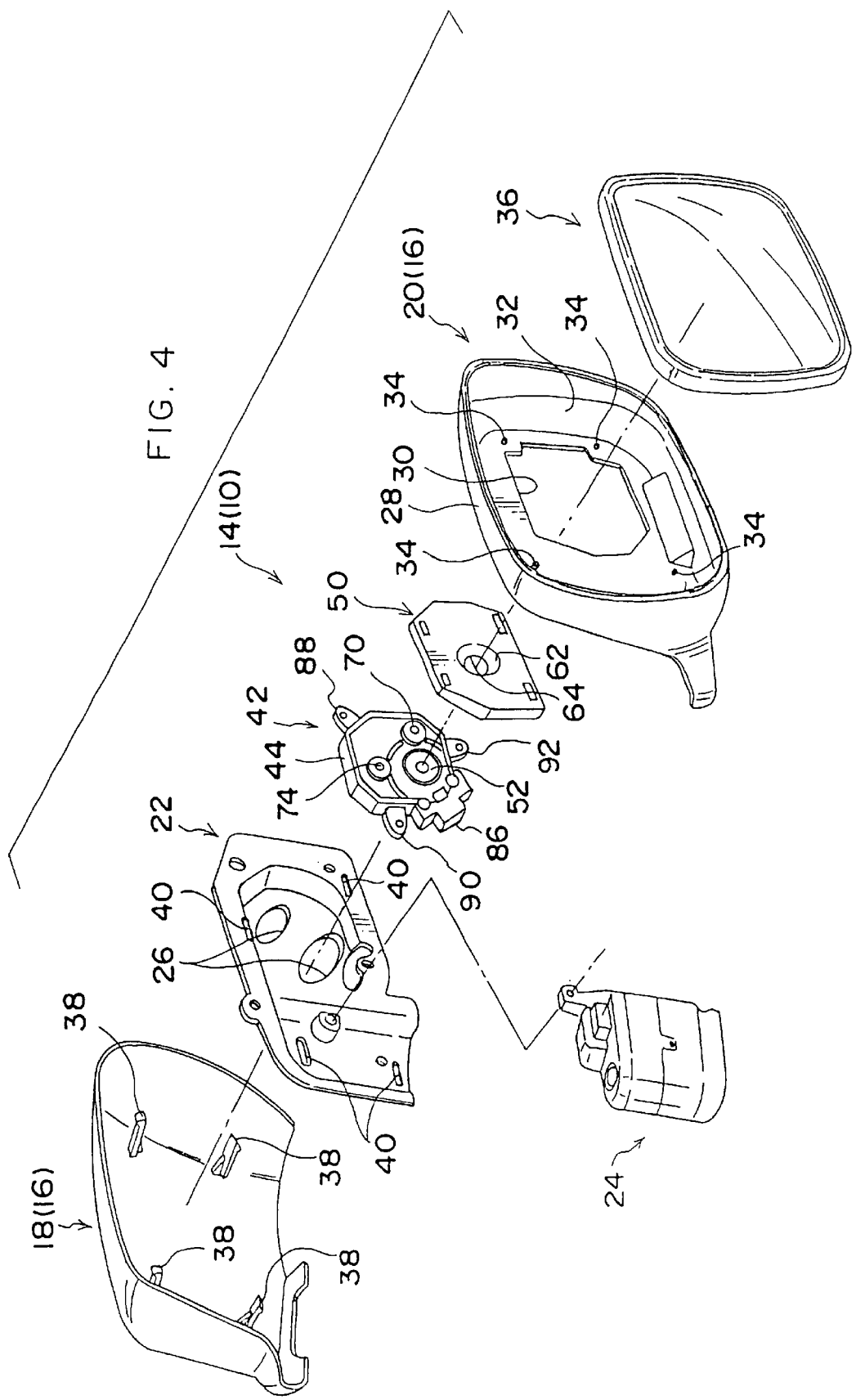
FIG. 4 is an exploded perspective view of a door mirror device, into which the mirror driving unit illustrated in FIG. 3 is incorporated.
Figure 5:
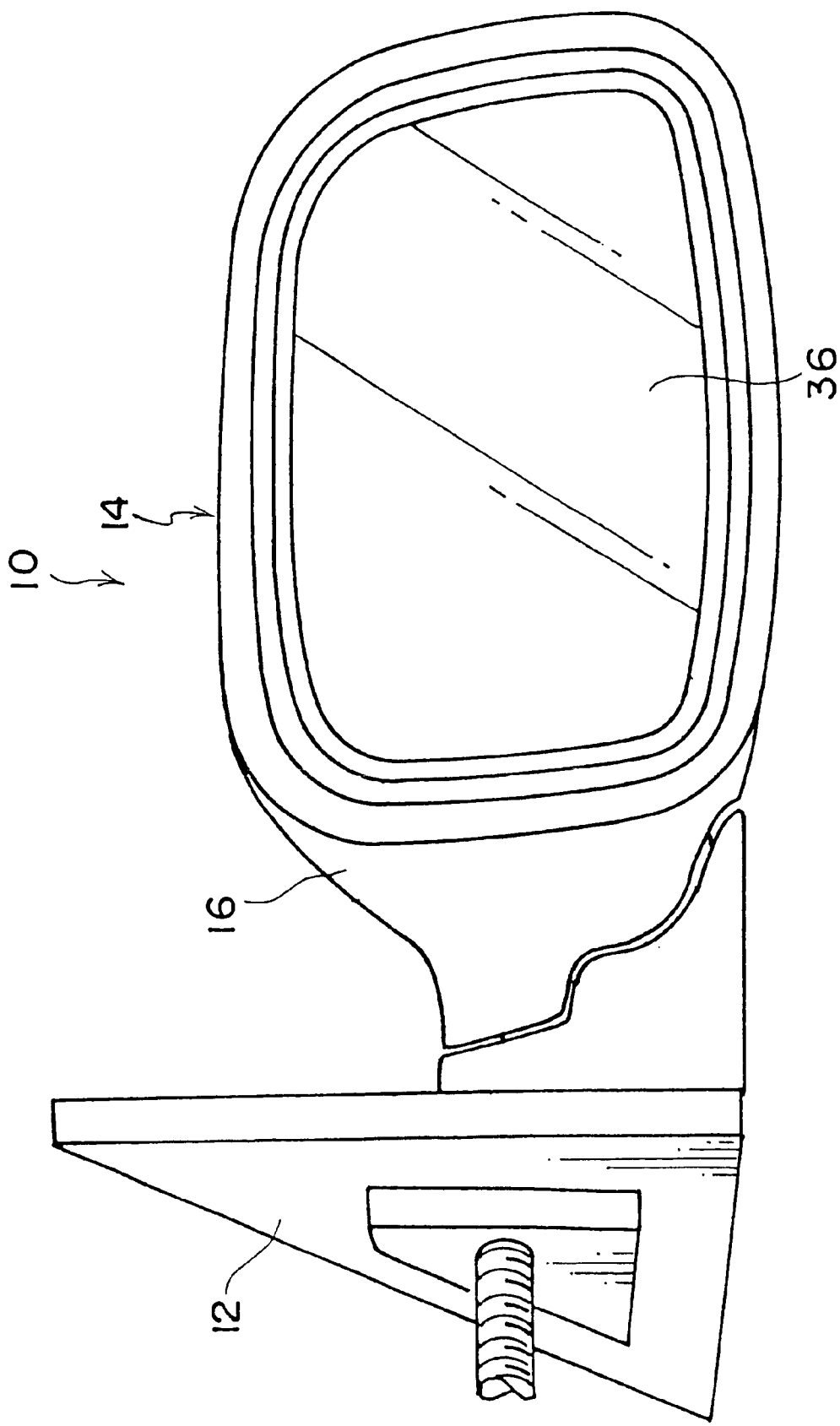
FIG. 5 is a plan view of an assembled state of the door mirror device illustrated in FIG. 4.
Figure 6:
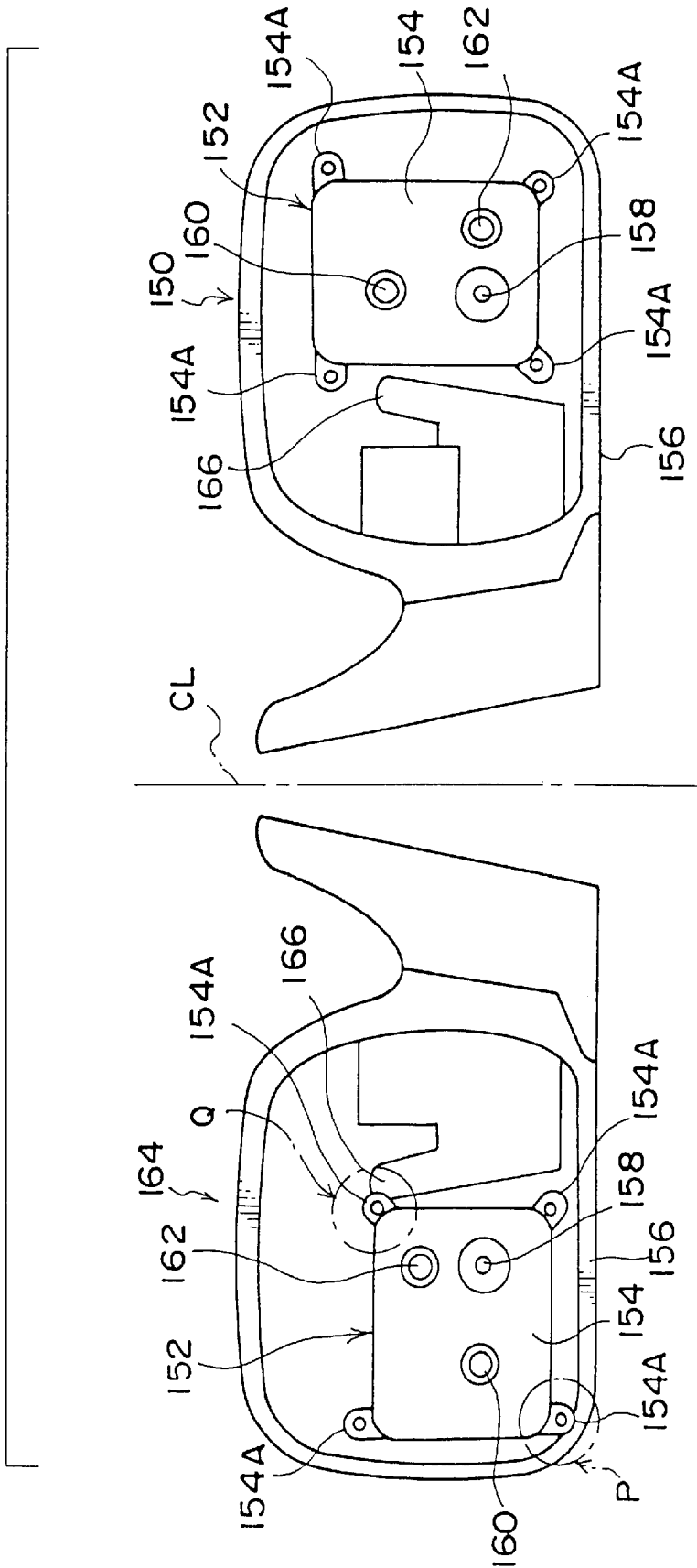
FIG. 6 is an overall structural view which corresponds to FIG. 1 and is for explaining problems of a conventional structure.

As shown in FIG. 4 and FIG. 5, the door mirror device 10 is formed by a door mirror base 12 which is substantially triangular and which can be mounted to a vicinity of a corner portion formed by the door outer panel at the front of a vehicle and the A pillar of the vehicle, and a door mirror main body 14 which is supported so as to be rotatable in a substantially horizontal plane of the vehicle with respect to the door mirror base 12.

The door mirror main body 14 is equipped with a door mirror visor 16 which is made of resin and forms the outer contour of the door mirror device 10. The door mirror visor 16 is a structure which is divided into two parts (two-piece structure), one toward the vehicle front side and one toward the vehicle rear side, and is formed by two pieces which are a visor cover 18 and a visor rim 20. The visor cover 18 forms the front portion outer contour of the door mirror main body 14 (the vehicle front side outer contour of the visor 16), and is shaped as a substantial box shape whose vehicle rear side is open. Further, the visor rim 20 forms the rear portion outer contour of the door mirror main body 14 (the vehicle rear side outer contour of the visor 16), and is a substantially frame-shaped form which is fit into the opening side end portion of the visor cover 18.

A metal or resin frame 22 which is formed in a substantially rectangular plate-shaped form is disposed between the visor cover 18 and the visor rim 20. Driving portions such as an electric retracting unit 24 and a mirror driving unit 42 which will be described later are mounted to the front surface side (vehicle rear side) of the frame 22. A pair of openings 26 are formed in the substantially central portion of the frame 22, and two wires (not shown) are connected to the back surface side (vehicle front side) of the mirror driving unit 42 through the two openings 26. Further, a mirror holder 50 which will be described later is mounted to the front surface side (vehicle rear side) of the mirror driving unit 42.

The visor rim 20 disposed at the vehicle rear side with respect to the frame 22 is basically formed by a frame body 28, which forms the outer shape (design surface) of the visor rim 20, and a separating wall 32, which is formed at an intermediate portion of the frame body 28 and whose central portion a relatively large opening 30 is formed. Insert-through holes 34 are formed at the four corners of the separating wall 32. The visor rim 20 is fixed to the frame 22 by screws (not shown) being screwed into the four insert-through holes 34.

Further, a mirror 36 serving as a "mirror body" for viewing the region at a rear of the vehicle is disposed at the vehicle rear side of the separating wall 32 in the visor rim 20. The mirror 36 is connected to the mirror holder 50 of the mirror driving unit 42 through the opening 30 formed in the separating wall 32.

Four resin claws 38 which are reinforced by ribs are provided so as to project toward the rear side of the vehicle at the four corners of the bottom portion of the visor cover 18 which is disposed at the vehicle front side of the frame 22. In correspondence with the four resin claws 38, four elongated holes 40 are formed at the four corners of the frame 22, and the resin claws 38 are elastically anchored into the elongated holes 40. In this way, the visor cover 18 is fixed to the frame 22 in the state in which the visor cover 18 is fit together with the visor rim 20.

[Structure of the Mirror Driving Unit 42]

Next, the structure of the mirror driving unit 42 serving as a "mirror surface angle adjusting device" will be described. Note that description will be given, as an example, of the mirror driving unit 42 which is incorporated in the door mirror device 10 which is disposed at the right side of the vehicle. A plan view of the mirror driving unit 42 is shown in FIG. 3, and a vertical sectional view of the mirror driving unit 42 is shown in FIG. 2.

Figure 2:
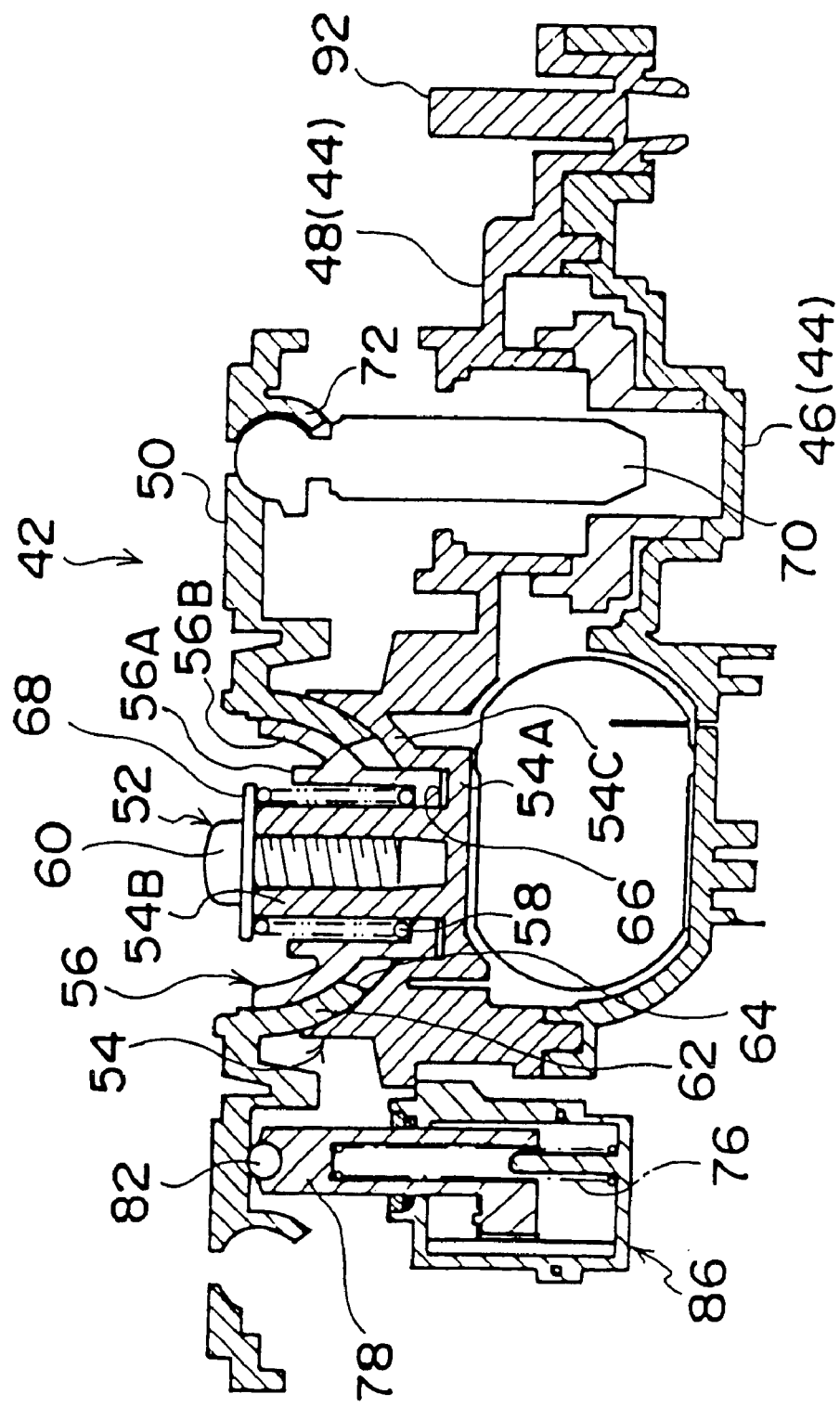
FIG. 2 is a sectional view taken along line 2—2 of FIG. 3, which illustrates a vertical sectional structure of the mirror driving unit relating to the embodiment.
Figure 3:
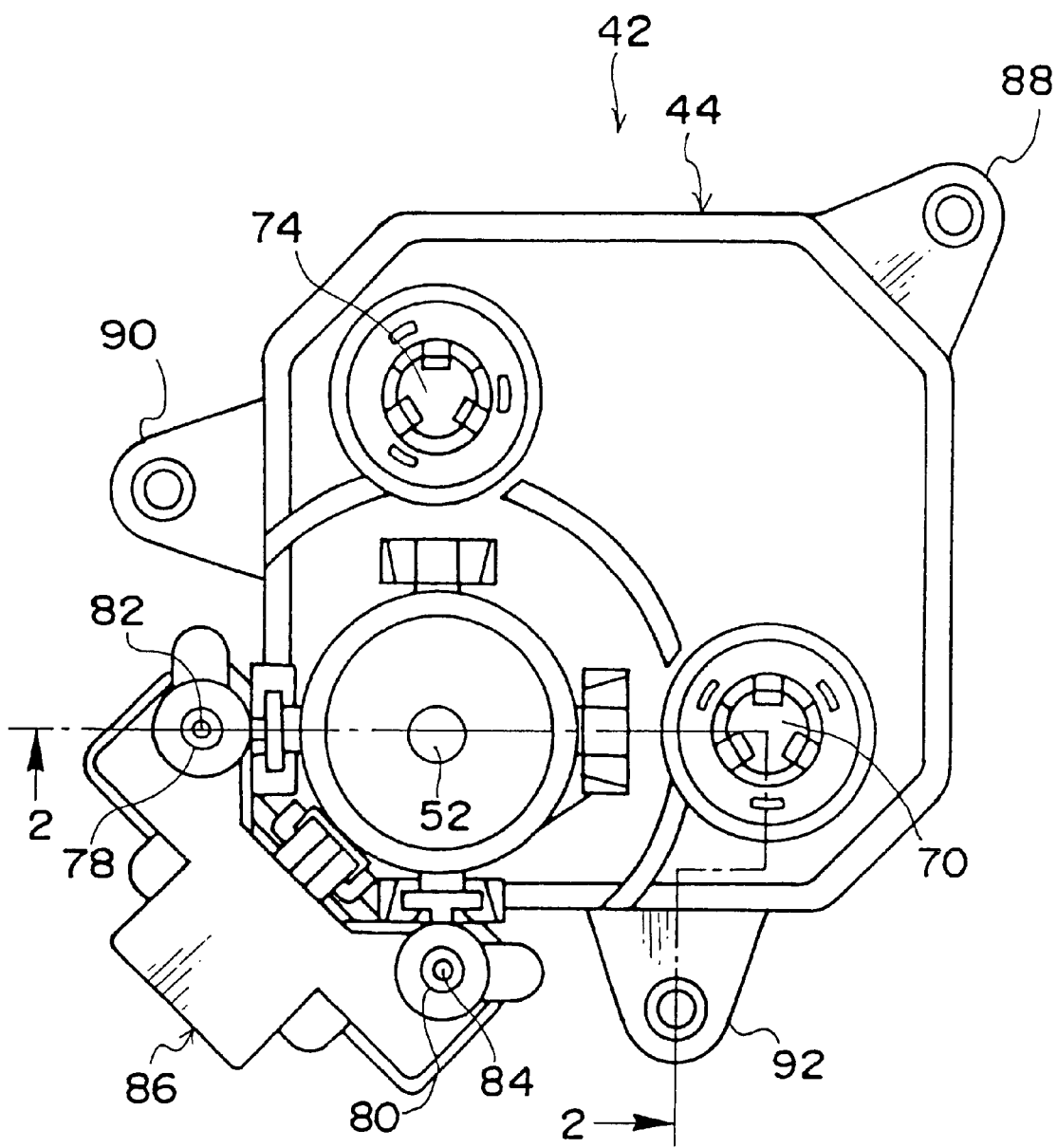
FIG. 3 is a plan view of the mirror driving unit relating to the embodiment.

As shown in FIG. 2 and FIG. 3, the mirror driving unit 42 is provided with a housing 44 which, on the whole, forms a relatively thin, substantially square plate-shaped configuration. The housing 44 of the mirror driving unit 42 is formed by a front housing 46 which is disposed at the vehicle front side, and a rear housing 48 which is disposed at the vehicle rear side. The outer contour of the unit is formed by the front housing 46 and the rear housing 48 being fit together and made integral.

A pivot portion 52, which is for swingably supporting the mirror holder 50 (the entire mirror holder 50 is illustrated in FIG. 4) which serves as a "holding member" and which is formed in a substantially rectangular plate-shape, is provided in a vicinity of the lower left corner of the mirror driving unit 42. The pivot portion 52 is basically formed by a spherical receiving portion 54 which is a hemispherical recess which has a bottom and which is integral with the rear housing 48; a hemispherical retainer 56 which has a bottom and which is formed to be a size smaller than the spherical receiving portion 54 and which is mounted at the inner side of the spherical receiving portion 54; a compression coil spring 58 which presses and urges the retainer 56 toward the spherical receiving portion 54; and a screw 60.

To explain the structure of the pivot portion 52 in more detail, the spherical receiving portion 54 is formed by a cylindrical holding portion 54A which has a bottom and which is formed at a relatively shallow bottom; an elongated cylindrical boss 54B which is formed at an axially central portion of the holding portion 54A; and a spherical supporting portion 54C which extends outwardly in the radial direction from the holding portion 54A. On the other hand, the retainer 56 is formed by a shaft portion 56A which is a cylindrical form having a bottom and which is inserted into the holding portion 54A of the spherical receiving portion 54; and a spherical pressing portion 56B which extends outwardly in the radial direction from an intermediate portion of the shaft portion 56A. Further, a hemispherical shaft supporting portion 62, which is formed at a substantially central portion of the mirror holder 50, is nipped between the spherical supporting portion 54C of the spherical receiving portion 54 and the spherical pressing portion 56B of the retainer 56.

A through hole 64, whose diameter is greater than the outside diameter of the shaft portion 56A of the retainer 56, is formed at the center of the shaft supporting portion 62 at the mirror holder 50. Further, a boss insertion hole 66, through which the boss 54B is inserted, is formed at the bottom portion of the shaft portion 56A of the retainer 56. The compression coil spring 58 is provided between the shaft portion 56A of the retainer 56 and the boss 54B in a state in which the boss 54B is inserted in the boss insertion hole 66. Moreover, the screw 60 is screwed into the boss 54B via a washer 68.

By using the washer 68, the washer 68 acts as a spring seat, and makes the urging force of the compression coil spring 58 act on the shaft supporting portion 62 of the mirror holder 50 via the retainer 56. In this way, a structure in which the shaft supporting portion 62 of the mirror holder 50 is swingably supported by the spherical receiving portion 54 is achieved. Note that, the holding position of the mirror holder 50 (the mirror 36) by the pivot portion 52 is the center of gravity of the mirror 36.

A second drive rod 70 serving as a "second adjusting device" for adjusting the left-and-right direction angle when the mirror 36 is swung about the pivot portion 52, is disposed at the right side corner portion of the mirror driving unit 42. Due to the second drive rod 70 receiving a driving force, the second drive rod 70 is moved in the axial direction thereof. The distal end portion of the second drive rod 70 is rotatably supported (connected) to a shaft supporting portion 72 which is formed at the rear surface side (the vehicle front side) of the mirror holder 50.

A first drive rod 74 serving as a "first adjusting device" for adjusting the vertical direction angle when the mirror 36 is swung around the pivot portion 52, is disposed at the upper side corner portion of the mirror driving unit 42. Because the driving mechanism of the first drive rod 74 is the same as that of the second drive rod 70, description thereof will be omitted.

As will be described later, when the mirror driving unit 42 is incorporated into the door mirror device 10 which is disposed at the left side of a vehicle, the mirror angle adjusting directions of the first drive rod 74 and the second drive rod 70 are switched. Thus, for convenience of explanation, in the mirror driving unit 42 at the left side of FIG. 1, parts which are structurally the same are denoted by numerals which are not in parentheses, and parts which are functionally the same are denoted by numerals in parentheses.

Further, in a vicinity of the pivot portion 52 in the mirror driving unit 42, a first shaft 78, which is for detecting the left-and-right direction angle, and a second shaft 80, which is for detecting the vertical direction angle, are pressed and urged toward the mirror holder 50 by the urging force of compression coil springs 76. (In FIG. 2, only the spring for detection of the left-and-right direction angle is illustrated.) In this way, mirror angle detecting devices 86, which individually detect the left-and-right direction angle and the vertical direction angle of the mirror 36 by balls 82, 84, which are held so as to be freely rollable at the distal end portions of the first shaft 78 and the second shaft 80 for detection of the left-and-right direction angle and the vertical direction angle, abutting the rear surface (the vehicle front side surface) of the mirror holder 50, are removably mounted.

[Structure of Main Portions of the Present Embodiment]

Figure 1:
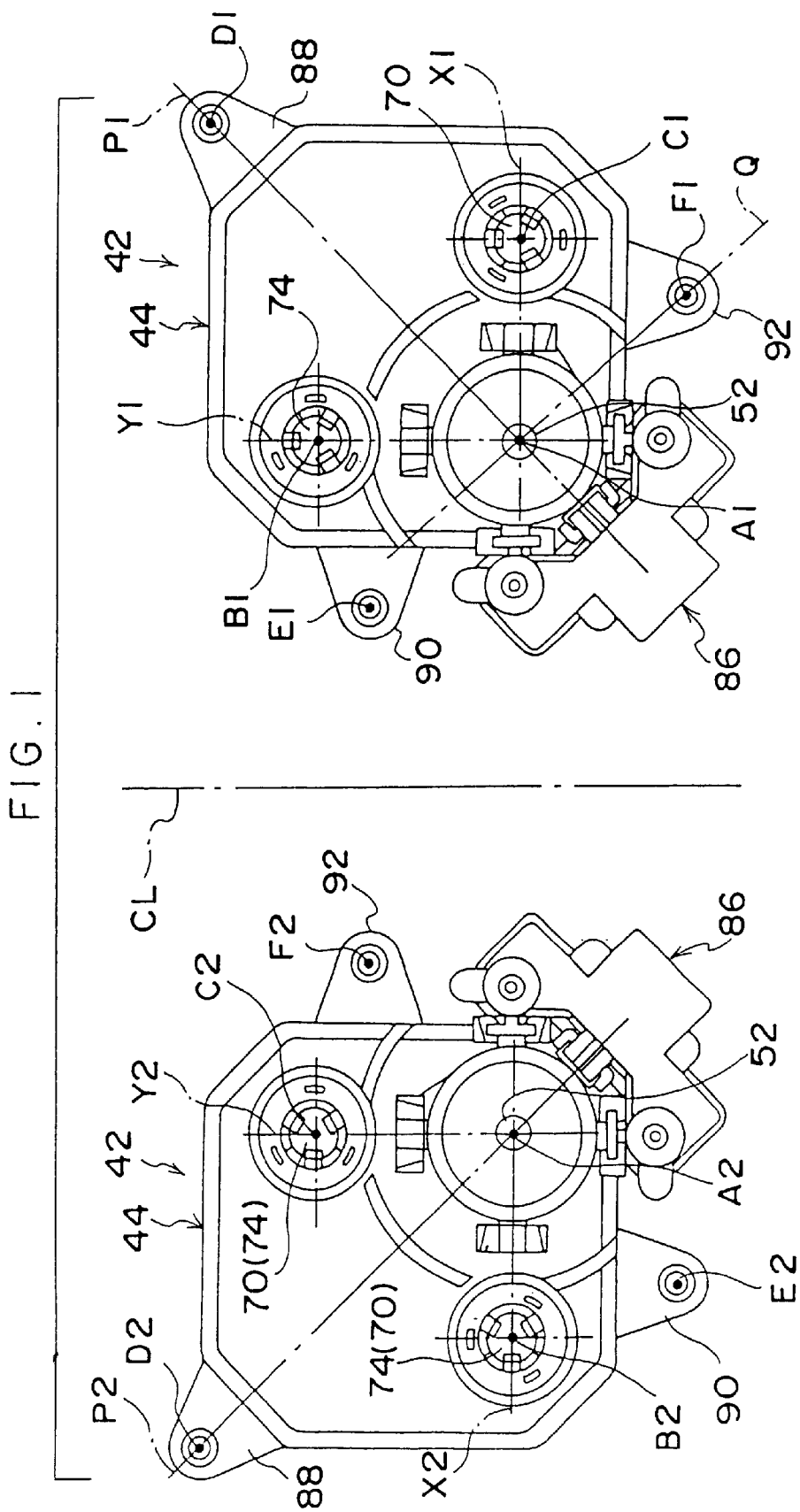
FIG. 1 is an overall structural view which illustrates a state at a time when a mirror driving unit relating to an embodiment of the present invention is incorporated into left and right door mirror devices.

Here, in the present embodiment, as shown in FIG. 1, mounting portions which are formed in substantially triangular forms are set at three specific points of the housing 44 of the mirror driving unit 42.(These mounting portions will hereinafter be called a "first mounting portion 88", a "second mounting portion 90", and a "third mounting portion 92".) In the present embodiment, using as an example the mirror driving unit 42 which is incorporated into the door mirror device 10 at the right side of a vehicle, the positional relationships between the respective points are set such that a first adjusting point B1 of the first drive rod 74 and a second adjusting point C1 of the second drive rod 70 are line symmetrical with respect to a 45° direction reference line P1 which forms an angle of elevation of substantially 45° with respect to a unit transverse direction reference line X1 (corresponding to a "vehicle transverse direction reference line") passing through a fulcrum of swinging A1 of the pivot portion 52 and which passes through the fulcrum of swinging A1. Note that the positional relationships are set in the same way for the mirror driving unit 42 at the left side as well.

Moreover, the positional relationships of the respective points are set such that a first mounting point D1 is set on the 45° direction reference line P1, and a second mounting point E1 and a third mounting point F1 have line symmetry with respect to the 45° direction reference line P1. Note that the positional relationships are set in the same way for the mirror driving unit 42 at the left side as well.

In the present embodiment, as described above, the respective points are set to be symmetrical with respect to the 45° direction reference line P1 (P2), and not only do the respective points have point symmetry at the left and right mirror driving units 42 (the phase difference is 90°), but also, the respective points have line symmetry at the left and right of a vertical direction center line CL of the vehicle in FIG. 1.

Further, in the above description, the 45° direction reference line P1 (P2) is described by using as an example the unit transverse direction reference line X1 (X2) (corresponding to a "second straight line"). However, the 45° direction reference line P1 (P2) may be defined by using as a reference a unit vertical direction reference line Y1 (Y2) which passes through the fulcrum of swinging A1 (A2) (the unit vertical direction reference line Y1 (Y2) corresponds to a "first straight line"). In this case, the 45° direction reference line P1 (P2) is a line which forms an angle of depression of substantially 45° with respect to the unit vertical direction reference line Y1 (Y2), and which passes through the fulcrum of swinging A1 (A2).

Next, operation and the effects of the present embodiment will be described.

Angle adjustment of the mirror 36 using the mirror driving unit 42 is carried out as follows. A case will be described using as an example the mirror driving unit 42 which is incorporated in the door mirror device 10 at the right side of a vehicle. When a driving force is applied to the second drive rod 70 of the mirror driving unit 42, the second drive rod 70 moves in the axial direction. The distal end portion of the second drive rod 70 is rotatably supported (connected) at the shaft supporting portion 72 which is formed at the rear surface side (the vehicle front side) of the mirror holder 50. Thus, when the second drive rod 70 moves in the axial direction, the mirror holder 50 is swung in the left-and-right direction of the vehicle around the pivot portion 52 (i.e., with the pivot portion 52 as a fulcrum) by an angle which corresponds to the stroke of the axial direction movement of the second drive rod 70. Thus, the mirror surface angle, in the left-and-right direction, of the mirror 36 which is connected to the mirror holder 50 is adjusted to desired angle.

On the other hand, when driving force is applied to the first drive rod 74, the first drive rod 74 moves in the axial direction. The distal end portion of the first drive rod 74 is rotatably supported (connected) at the shaft supporting portion which is formed at the rear surface side (vehicle front side) of the mirror holder 50. Thus, when the first drive rod 74 moves in the axial direction, the mirror holder 50 is swung in the vertical direction of vehicle around the pivot portion 52 by an angle which corresponds to the stroke of the axial direction movement of the first drive rod 74. Thus, the mirror surface angle, in the vertical direction, of the mirror 36 which is connected to the mirror holder 50 is adjusted to desired angle.

The amounts of swinging, in the vertical and in the left-and-right direction, of the mirror holder 50 around the pivot portion 52 are individually detected by the mirror angle detecting device 86.

In the present embodiment, the positional relationships of the respective positions are set such that the first adjusting point B1 (B2) and the second adjusting point C1 (C2) have line symmetry with respect to the 45° direction reference line P1 (P2) which passes through the fulcrum of swinging A1 (A2). Thus, the same type of mirror driving unit 42 can be incorporated into both left and right door mirror devices 10.

To describe this point more concretely, for example, the positional relationships of the main points at the mirror driving units 42 which are incorporated into left and right door mirror devices 10 are such that the points have line symmetry with respect to the 45° direction reference line P1 (P2). In the case in which the same type of mirror driving unit 42 is actually incorporated into left and right door mirror devices 10, as shown in FIG. 1, in the case in which the mirror driving unit 42 is incorporated into the right side door mirror device 10, the mirror driving unit 42 is used in the state in which the 45° direction reference line P1 is tilted to the right by 45° with respect to the vehicle center line CL. Conversely, in the case in which the mirror driving unit 42 is incorporated into the left side door mirror device 10, the mirror driving unit 42 is used in the state in which the 45° direction reference line P2 is tilted to the left by 45° with respect to the vehicle center line CL. Namely, there is a phase offset of 90° at the left and right mirror driving units 42.

From the functional point of view, in the case in which the mirror driving unit 42 is incorporated in the right side door mirror device 10, the first drive rod 74 (the first adjusting point B1) serves to adjust the mirror surface angle in the vehicle vertical direction. On the other hand, in the case in which the mirror driving unit 42 is incorporated in the left side door mirror device 10, the first drive rod 74 (the first adjusting point B2) serves to adjust the mirror surface angle in the vehicle left-and-right direction. The same holds for the second drive rod 70 (the second adjusting points C1, C2). Thus, the positional relationship of the first drive rod 74 and the second drive rod 70 is expressed as a phase difference of 90°, and the directions in which the mirror surface angle is adjusted are merely switched (one is replaced by the other). Therefore, the functions themselves are not impaired, and the both mirror driving units 42 operate normally and satisfactorily.

As described above, the first mounting points D1, D2 are set on the 45° direction reference line P1 (P2), and the second mounting points E1, E2 and the third mounting points F1, F2 are set to be line symmetrical with respect to the 45° direction reference line P1 (P2). Further, the left and right door mirror visors 16 which are provided at the door mirror devices 10 are formed substantially line symmetrically with respect to the vehicle vertical direction central line CL. Therefore, if the mirror driving unit 42 can be appropriately (i.e., without the second mounting portion E1 or the third mounting portion F1 interfering with the inner wall and the like of the visor cover 18 or the visor rim 20) mounted to the frame 22 in the door mirror visor 16 of the right side door mirror device 10, the mirror driving unit 42 can also be mounted in the left side door mirror device 10. Accordingly, in both the case in which the mirror driving unit 42 is incorporated into the right side door mirror device 10 and the case in which the mirror driving unit 42 is incorporated into the left side door mirror device 10, the mounting of the mirror driving unit 42 is not hindered.

As described above, in accordance with the present embodiment, the mirror driving unit 42 which is the same product can be used in common in both left and right door mirror devices 10.

Further, in the present embodiment, as is described above, the positional relationships of the respective points are set such that the first adjusting point B1 (B2) and the second adjusting point C1 (C2) are symmetrical with respect to the 45° direction reference line P1 (P2) which passes through the fulcrum of swinging A1 (A2). Thus, the distance between the fulcrum of swinging A1 (A2) and the first adjusting point B1 (B2), and the distance between the fulcrum of swinging A1 (A2) and the second adjusting point C1 (C2), are equal to each other. Therefore, when the mirror driving units 42 which are the same are used for both of a pair of the left and right door mirror devices 10, the positional relationships of the points of application of driving force to the mirror holder 50, and thus to the mirror 36, are exactly the same at the left and right sides. As a result, in accordance with the present embodiment, common use of the mirror driving unit 42 at the left and right sides can be achieved, and precision of adjustment of the mirror surface angle is maintained well.

Moreover, to describe a case in which the mirror driving unit 42 relating to the present embodiment is incorporated in the right side door mirror device 10, as shown in FIG. 1, when the mirror driving unit 42 is rotated in 45° downward around the fulcrum of swinging A1 such that the 45° direction reference line is rotated and displaced from P1 to Q, the first adjusting point B1 is displaced to the second adjusting point C1, and the second adjusting point C1 is displaced to the opposite side of the first adjusting point B1 with respect to the fulcrum of swinging A1 (a position which is line symmetrical with respect to the unit transverse direction reference line X1), and becomes the new first adjusting point. Therefore, the mirror unit 42 can be used as well for a door mirror device which is preferably used in this state (in a case in which the shape of the door mirror visor greatly swells out downwardly due to various factors). As a result, in accordance with the present embodiment, the mirror driving units 42 which are the same can be used for the door mirror devices 10 which are in a total of four states.

In the present embodiment, the mirror driving unit 42 is mounted to the frame 22 at a total of three points. The positions of the points are set such that the first mounting point D1 (D2) is set on the 45° direction reference line P1 (P2), and the second mounting point E1 (E2) and the third mounting point F1(F2) are symmetrical with respect to the 45° direction reference line P1 (P2). Therefore, not only can the same type of mirror driving unit 42 be used for the door mirror devices 10 which are in a total of four states, but also, a stable mounted state of the mirror driving unit 42 can be insured by a minimum number of mounting points.

Moreover, in the present embodiment, the first adjusting point B1 (B2) is disposed on the vertical direction line which passes through the fulcrum of swinging A1 (A2), and the second adjusting point C1 (C2) is disposed on the horizontal direction line which passes through the fulcrum of swinging A1 (A2). Therefore, compared with a case in which the first adjusting point and the second adjusting point are not disposed on the vertical direction line and the horizontal direction line which pass through the fulcrum of swinging A1 (A2), stable adjustment of the mirror surface angle can be carried out.

Here, supplementary description relating to the present embodiment will be given. In the above-described embodiment, the positional relationships between the respective points, and in particular, the positional relationships between the first adjusting point B1, B2 of the first drive rod 74 and the second adjusting point C1, C2 of the second drive rod 70, are set to have line symmetry with respect to the 45° direction reference line P1, P2. Note that, an "elevation angle of substantially 45°" which prescribes the 45° direction reference line P1, P2 is an angle which has a range of tolerance to a certain extent (for example, 45°±5° or the like), and does not mean precisely 45°.

Further, in the above-described present embodiment, three mounting points are used as the minimum number of mounting points needed for a stable mounted state of the mirror driving unit 10. However, the present invention is not limited to the same, and four or more mounting points can be set.

Moreover, in the present embodiment, a mechanism in which the mirror surface angle is adjusted by moving the first drive rod 74 and the second drive rod 70 in the axial directions thereof is adopted. However, the present invention is not limited to the same, and any mechanism can be used provided that it can adjust the mirror surface angles (for example, a mechanism using a cam, or a rack-and-pinion mechanism, or the like).

Further, in the present embodiment, although the present invention is applied to the door mirror device 10, the present invention is not limited to the same, and may be applied to a fender mirror.

As described above, from the functional standpoint as well, there are no obstructions which arise at the time of mounting the mirror surface angle adjusting device relating to the present invention. As a result, the present invention has an excellent effect in that the same mirror surface angle adjusting device can be used for both left and right outer mirror devices for a vehicle.

What is claimed is:

1. A mirror surface angle adjusting device for mounting in a rear view vehicle outer mirror device, the mirror surface angle adjusting device comprising:

a pivot portion which swingably supports a holding member for holding a mirror body;

a first adjusting device connected to the holding member, and which swings the holding member, in one of a vertical direction and a left-and-right direction, around the pivot portion by receiving driving force and being displaced;

a second adjusting device connected to the holding member, and which swings the holding member, in another of the vertical direction and the left-and-right direction, around the pivot portion by receiving driving force and being displaced; and a housing which accommodates the pivot portion, the first adjusting device, and the second adjusting device, and the housing including a plurality of mounting portions for mounting in the rear view vehicle outer mirror device, wherein in a case in which the mirror surface angle adjusting device is mounted in a rear view vehicle outer mirror device disposed at an exterior of a vehicle, a first adjustment point of the first adjusting device and a second adjustment point of the second adjusting device have line symmetry with respect to a 45° direction reference line which forms an angle of elevation of substantially 45° with respect to a vehicle transverse direction reference line passing through a fulcrum of swinging of the pivot portion and which passes through the fulcrum of swinging, and positional relationships of mounting points of the plurality of mounting portions are set such that the mounting points have line symmetry with respect to the 45° direction reference line.

2. A mirror surface angle adjusting device according to claim 1, wherein the plurality of mounting points comprises three points, said one of the mounting points being set on the 45° direction reference line, and second mounting and third mounting points set at positions which are substantially line symmetry with respect to the 45° direction reference line.

3. A mirror surface angle adjusting device according to claim 2, wherein the first adjusting point is set on a vertical direction line which passes through the fulcrum of swinging, and the second adjusting point is set on a horizontal direction line which passes through the fulcrum of swinging.

4. A mirror surface angle adjusting device according to claim 1, wherein the first adjusting point is set on a vertical direction line which passes through the fulcrum of swinging, and the second adjusting point is set on a horizontal direction line which passes through the fulcrum of swinging.

5. A mirror surface angle adjusting device according to claim 1, wherein the first adjusting device moves in an axial direction relative to the first adjusting device due to receipt of the driving force, and the second adjusting device moves in an axial direction relative to the second adjusting device due to receipt of the driving force.

6. A mirror surface angle adjusting device according to claim 1, wherein the mirror body include a mirror surface, the mirror surface angle adjusting device further comprising:

a mirror angle detecting device for independently detecting a vertical direction angle of the mirror surface and a left-and-right direction angle of the mirror surface.

7. A mirror surface angle adjusting device according to claim 6, wherein the mirror angle detecting device includes a first member for detecting the left-and-right direction angle, the first member comprising a distal end portion, a second member for detecting the vertical direction angle, the second member comprising a distal end portion, and a spherical member held rollably at the distal end portion of each of the first member and the second member, and a compression coil spring disposed between the first member and the spherical member corresponding to the first member, and another compression coil spring disposed between the second member and the spherical member corresponding to the second member.

8. A mirror surface angle adjusting device according to claim 1, wherein the housing includes a front housing disposed at a vehicle front side and a rear housing disposed at a vehicle rear side, and the front housing and the rear housing mating together, when the mirror surface angle adjusting device is being used in a rear view vehicle outer mirror device.

9. A mirror surface angle adjusting device according to claim 8, wherein the housing generally corresponds to a thin, square, flat-plate shape.

10. A mirror surface angle adjusting device according to claim 8, wherein the pivot portion comprises a spherical receiving portion including a hemispherical concave portion comprising a bottom and formed integrally with the rear housing, a hemispherical retainer including a bottom and formed smaller in size than the spherical receiving portion and received therein, a compression coil spring urging the retainer toward the spherical receiving portion, and a screw.

11. A mirror surface angle adjusting device according to claim 10, wherein the spherical receiving portion comprises a cylindrical holding portion and includes a bottom, a boss corresponding in shape to an elongated cylinder formed at an axially central portion of the holding portion, and a spherical supporting portion extending radially outward from the holding portion.

12. A mirror surface angle adjusting device according to claim 11, wherein the retainer comprises a cylindrical shaft portion inserted in the holding portion of the spherical reeiving portion, and a spherical pressing portion extending radially outward from an intermediate portion of the shaft portion.

13. A mirror surface angle adjusting device according to claim 12, wherein the holding member includes a shaft supporting portion, with the shaft supporting portion nipped between the spherical supporting portion of the spherical receiving portion and the spherical pressing portion of the retainer.

14. A mirror surface angle adjusting device according to claim 13, wherein the shaft supporting portion of the holding member is formed hemispherically at a substantially central portion of the holding member, and a through hole, whose diameter is greater than an outer diameter of the shaft portion of the retainer, is formed in a center of the shaft supporting portion.

15. A mirror surface angle adjusting device according to claim 14, wherein the shaft portion comprises a bottom portion including a boss insertion hole defined therein at the retainer, through which the boss is inserted, and when the compression coil spring is disposed between the shaft portion of the retainer and the boss, the screw is screwed into the boss.

16. A mirror surface angle adjusting device according to claim 15, wherein urging force from the compression coil spring is applied to the shaft supporting portion of the holding member via the retainer, and the shaft supporting portion of the holding member swingably supports the spherical receiving portion.

17. A mirror surface angle adjusting device for mounting in a rear view vehicle outer mirror device, the mirror surface angle adjusting device comprising:
  a pivot portion which swingably supports a holding member for holding a mirror body;
  a first adjusting device connected to the holding member, and which swings the holding member, in one of a vertical direction and a left-and-right direction, around the pivot portion by receiving driving force and being displaced;
  a second adjusting device connected to the holding member, and which swings the holding member, in another of the vertical direction and the left-and-right direction, around the pivot portion by receiving driving force and being displaced; and
  a housing which accommodates the pivot portion, the first adjusting device, and the second adjusting device, and the housing including a plurality of mounting portions for mounting in the rear view vehicle outer mirror device,
  wherein in a case in which a straight line which passes through a fulcrum of swinging of the pivot portion and a first adjusting point of the first adjusting device is a first straight line, a second adjusting point of the second adjusting device passes through the fulcrum of swinging and is positioned on a second straight line which is orthogonal with respect to the first straight line, and the first adjusting point and the second adjusting point have line symmetry with respect to a 45° direction reference line which forms an angle of elevation of substantially 45° with respect to the second straight line and which passes through the fulcrum of swinging, and positional relationships of mounting points of the plurality of mounting portions are set such that the mounting points have line symmetry with respect to the 45° direction reference line.

18. A mirror surface angle adjusting device according to claim 17, wherein the first adjusting device moves in an axial direction relative to the first adjusting device due to receipt of the driving force, and the second adjusting device moves in an axial direction relative to the second adjusting device due to receipt of the driving force.

19. A mirror surface angle adjusting device according to claim 17, wherein the mirror body include a mirror surface, the mirror surface angle adjusting device further comprising:
  a mirror angle detecting device for independently detecting a vertical direction angle of the mirror surface and a left-and-right direction angle of the mirror surface.

20. A mirror surface angle adjusting device according to claim 19, wherein the mirror angle detecting device includes a first member for detecting the left-and-right direction angle, the first member comprising a distal end portion, a second member for detecting the vertical direction angle, the second member comprising a distal end portion, and a spherical member held rollably at the distal end portion of each of the first member and the second member, and a compression coil spring disposed between the first member and the spherical member corresponding to the first member, and another compression coil spring disposed between the second member and the spherical member corresponding to the second member.

* * * * *